(12) United States Patent  
Tanaka

(10) Patent No.: US 6,388,814 B2  
(45) Date of Patent: May 14, 2002

(54) HEAD MOUNTED DISPLAY

(75) Inventor: Haruo Tanaka, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/748,172

(22) Filed: Dec. 27, 2000

(30) Foreign Application Priority Data

Dec. 28, 1999 (JP) .......................................... 11-375598

(51) Int. Cl.[7] .............................. G02B 27/14; A61B 3/14
(52) U.S. Cl. ..................... 359/630; 351/209; 351/210
(58) Field of Search ................. 359/630, 633; 351/209, 210

(56) References Cited

U.S. PATENT DOCUMENTS

| | | | | |
|---|---|---|---|---|
| 4,109,237 A | * | 8/1978 | Hill | 382/117 |
| 5,428,413 A | * | 6/1995 | Shindo | 351/210 |
| 5,467,104 A | * | 11/1995 | Furness, III et al. | 345/8 |
| 5,596,339 A | * | 1/1997 | Furness, III et al. | 345/8 |
| 5,980,513 A | * | 11/1999 | Frey et al. | 606/10 |
| 5,982,555 A | * | 11/1999 | Melville et al. | 359/630 |

\* cited by examiner

*Primary Examiner*—Ricky Mack  
(74) *Attorney, Agent, or Firm*—Arent, Fox, Kintner, Plotkin & Kahn, PLLC

(57) ABSTRACT

A micro-display (1) and a condenser lens (2) focusing an image of the micro-display onto retina of human eye are provided within a case (3). Then, a reflected light detecting means (4) for detecting brightness of reflected light reflected by human retina, which comprises a block where a light emitting section (41) and a light receiving section (42) are provided alternately is provided. A location adjusting means for moving, for example, the condenser lens held with coil (51) so that amount detected by this reflected light detecting means, for example, is maximized and adjusting the relation so that the location relationship between the micro-display and the condenser lens is optimized. As a result, a head mounted display can be obtained which is capable of observing without occurring any fatigue of eyes in the case where one has to recognize both of the outside world and the display approximately at the same time.

12 Claims, 3 Drawing Sheets

HEAD MOUNTED DISPLAY

FIELD OF THE INVENTION

The present invention relates to a head mounted display with which one is capable of observing a pictorial image of an image, a moving picture and the like made by a computer through directly focusing onto retina by arranging a micro-display attached on glasses or the like in front of eyes. More particularly, the present invention relates to a head mounted display with which one is capable of observing under highly natural state by resolving a feeling of wrongness in the case where one of the eyes observes the faraway outside world while the other observes the head mounted display or in the case where the identical eye observes the display and the faraway, alternately. Here, a head mounted display does not mean only a display which is directly mounted on the head, but also a display which directly irritates an image into an eye of a person who is mounted with the head mounted display and which is not seen from the others except the person who is mounted with it such as in the case where the display is mounted on glasses or a hat.

BACKGROUND OF THE INVENTION

Recently, miniaturization of electronic devices is proceeded, a head mounted display (HMD), such as a wearable computer has been developed, which arranges pictorial images such as an image of computer, of a game and of a movie picture and the like in front of eyes of a human, directly projects the images onto retina and making it allow to be seen by only one person. As for such devices, a device is considered to be used such that a small micro-display scaled on the order of a square of millimeter units is arranged in front of one of eyes while the other eye is capable of observing the outside world in a free and ordinary state.

Thus, one has to see objects having largely different focal distances at each time of the moments in the case where left and right eyes or even the identical eye see the head mounted display and the outside world alternately, if it is in a state where it is not natural that one of the eyes observes the display while the other eye is focused on the outside world, or in a state where when the eye observing the head mounted display looks aside, comes to see the outside world. Since human eyes have the ability to correspond the situation by changing focusing image location to retina by the action of lens in the case where one sees objects having different distances from the eyes which are proximal and distal, one can follow to see a display and the outside world alternately. However, such following movements take some time to some degree. In addition, if one observes objects having different focal distances approximately at the same time or repeatedly, such as in the case where respective eye sees objects having different distances from the eyes or in the case where one observes the display and the outside world alternately, the eyes tends to be very easily tired and it is very much unpleasant to wear a head mounted display for a long time.

Furthermore, if a head mounted display is made in a state of see-through and one is capable of seeing the outside world behind a displaying image of the head mounted display, even human eyes cannot follow the situation that one has to see and recognize both of the display and the outside world.

SUMMARY OF THE INVENTION

The present invention is performed in consideration of such situations and an object of the present invention is to provide a head mounted display with which one is capable of observing almost without occurring the fatigue of the eyes, even in the case where one sees and recognizes both of the outside world and a head mounted display approximately at the same time.

Another object of the present invention is to provide a head mounted display capable of automatically switching into a power saving mode after certain time period when one does not observe the head mounted display by slightly looking aside or somehow even when the head mounted display is arranged in from the eyes.

A head mounted display according to the present invention comprises a micro-display, a condenser lens focusing an image of the micro-display onto retina of human eyes, a reflected light detection means for detecting brightness of the reflected light which is reflected on retina of human eye and location adjusting means for adjusting the relationship of locations of the micro-display and the condenser lens so as to optimizing the focusing image on the retina by the brightness of the reflected light. It should be noted that "optimizing the focusing image" means that making being in focus or making shift of an image in a lateral direction being in focus and focusing an image onto retina in a state of being easily recognizable.

By constructing a device into this structure, nevertheless the situation of lens of eye, the location relationship between the head mounted display and the condenser lens is adjusted so that a focusing image on retina is automatically optimized. Therefore, if one observes a head mounted display in a state of observing the faraway outside world, the location relationship between the head mounted display and the condenser lens is adjusted so that the most suitable focusing image on retina in that state is obtained. Moreover, if one observes only the head mounted display and observer's eye is adjusted by the action of lens of an eye so that the location of the display is focused, the location of the condenser lens is automatically adjusted so that the focus of the image of the display is formed onto retina in the state of its lens of an eye. Specifically, in order to adjust a focus of an image of the display corresponding to the state of lens of an eye before the adjustment of the action of lens of an eye, one can observe an image of the display at the same time without any feeling of wrongness in the state of an eye observing the outside world.

The reflected light detection means comprises a block of the light emitting section and the light receiving section which are formed in a portion of the display section of the micro-display. It will be good to have such structures that the block is means for detecting a reflected light reflected by the retina to which the light is emitted by the light emitting section or that a half mirror is provided between the micro-display and the lens and a detector for detecting the reflected light reflected by the half mirror is provided. It should be noted that the block of the light emitting section and the light receiving section is formed so that it is contained within the beam of the beam waist portion where the beam of the reflected light is most narrowed.

Further comprising a frequency modulating means which modulates a light of the light emitting section by alternating current, and a band pass filter selecting a detecting signal of the reflected light of the modulated light, and thereby can monitor the accurate intensity of the reflected light which is not influenced by noises with a small amount of emitting light.

Moreover, it is preferable that the reflected light detecting means has detection sections of two colors, which are at least different at wavelengths on the micro-display and adjusts the forgoing relationship to the most suitable location by the correlation of the detecting sections of at least two colors, or has detecting sections of the reflected light in at least two places which are located at different locations on the micro-display, and adjusts the forgoing relationship to the most suitable location by the correlation of the detecting sections of at least two places, thereby immediately determining whether forward or backward adjustment should be taken or whether left or right adjustment should be taken and adjustment to the accurate location can be carried out more rapidly.

By constituting the micro-display so that the display screen (pixels) is provided on the semiconductor substrate in which an integrated circuit is formed, the light receiving section of the reflected light detecting means can be formed directly on the substrate, a circuit for comparing the reflected lights, a driving circuit and the like can be formed on the substrate, therefore, it can be constituted in a three dimensional shape, is easily formed to be extremely compact and is desirable.

By providing an automatic switch means which makes at least the micro-display or the computer main body be power saving mode by detecting the output of the reflected light detecting means, and by turning one's eyes away from the display during certain time period, since the absence of reflected light by retina can be detected and made it be power saving mode, consumption of the power of portable devices can be suppressed and it is especially preferable to use as a portable device.

BRIEF DESCRIPTION OF THE DRAWINGS

For a more complete understanding of the present invention and the advantages thereof, reference is now made to the following detailed description taken in conjunction with the accompanying drawings, in which.

DETAILED DESCRIPTION OF THE INVENTION

Figure 1:
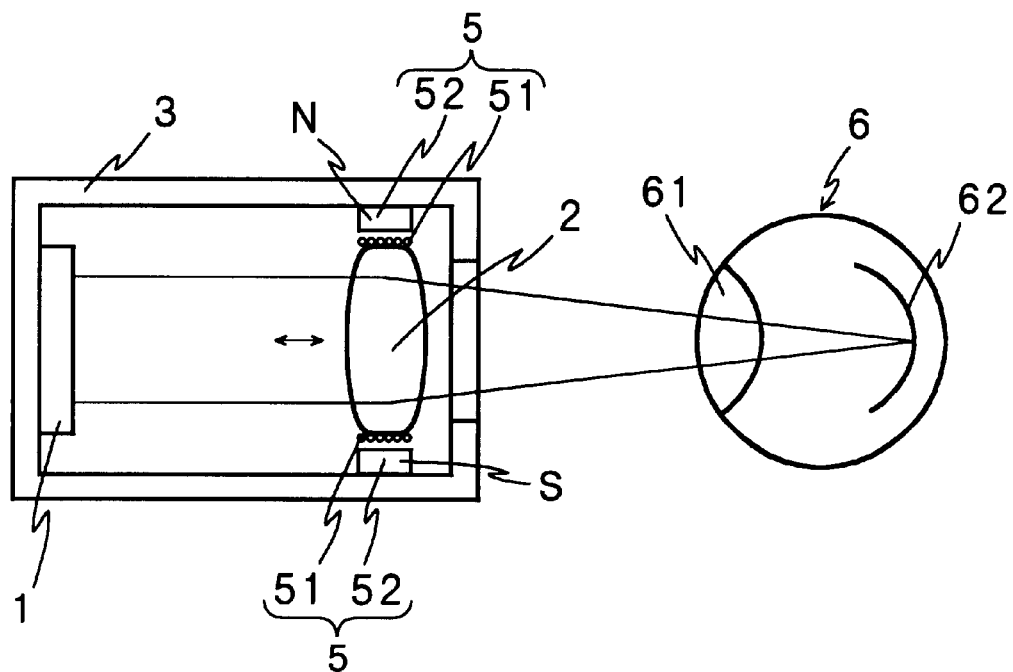
FIGS. 1 (*a*) through 1 (*f*) are constitutive illustrations showing one embodiment of a head mounted display according to the present invention.
Figure 1:
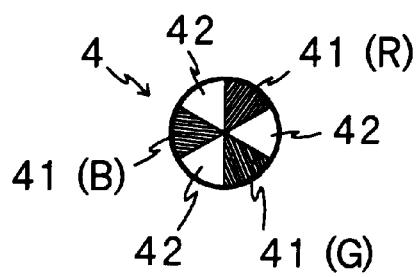
Figure 1:
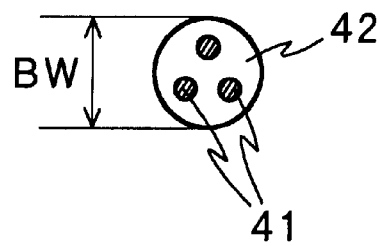
Figure 1:
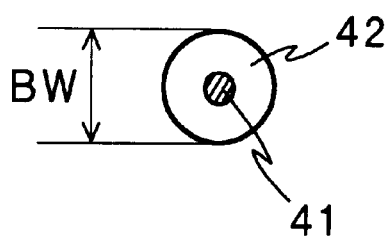
Figure 1:
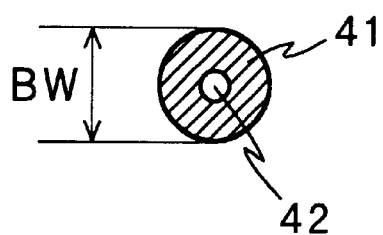
Figure 1:
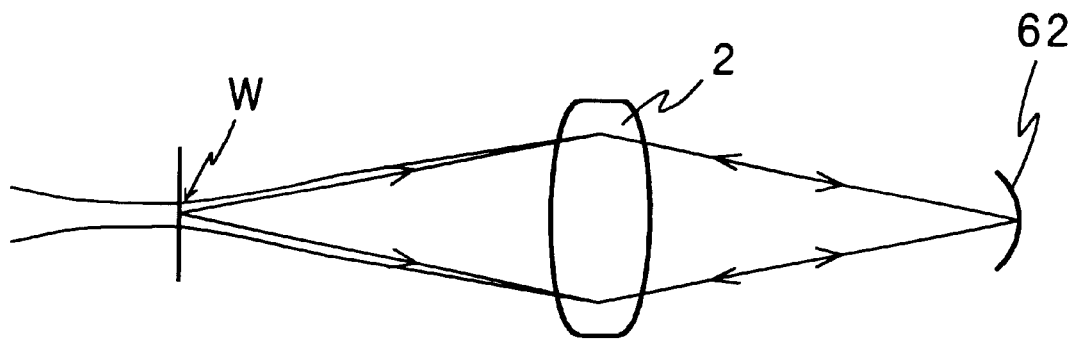

In a head mounted display according to the present invention as a constitutive illustration of its one embodiment is shown in FIG. 1(*a*), a micro-display 1 and a condenser lens 2 which focuses an image of its micro-display 1 on retina 62, and which is adjustable depending upon a state of a lens 61 of an eye 6 are provided within a case 3. And then, in an example shown in FIG. 1, in a portion of the micro-display 1 as shown in FIG. 1(*b*), a reflected light detecting means 4 for detecting brightness of the reflected light reflected by retina of human, and comprising a block in which a light emitting section 41 and a light receiving section 42 is provided alternately. It is constructed in a adjustable structure so that the location relationship between the micro-display and the condenser lens 2 is optimized, for example, by moving the condenser lens 2 held with a driving coil 51 of a location adjustment means 5 comprising the driving coil 51 and a magnet 52 by interaction of current and magnetic field, for example, so as to maximize an amount detected by this reflected light detecting means 4.

Figure 2:
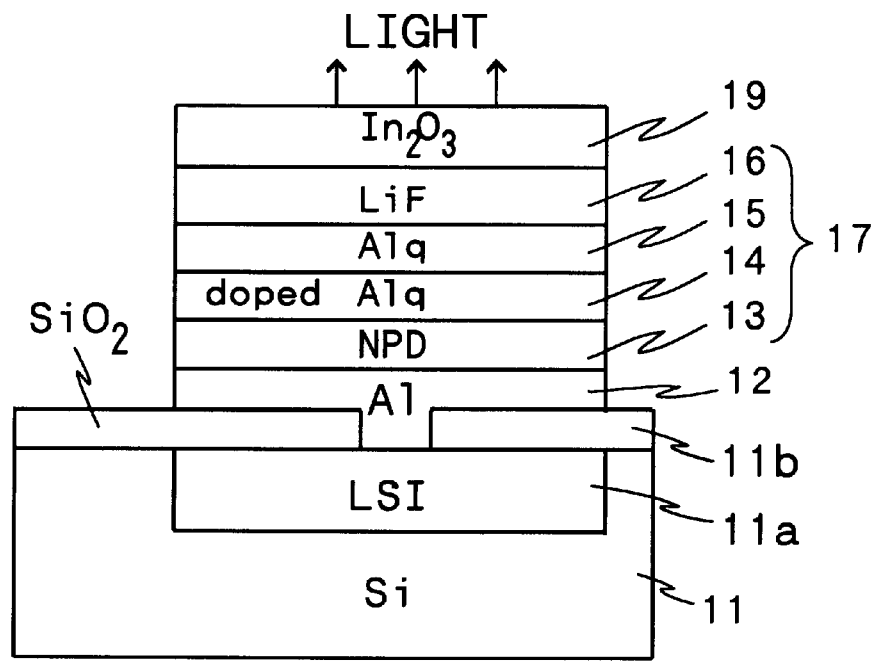
FIG. 2 is a sectional illustration showing an example forming one pixel of a display by an organic EL element.

As a sectional illustration of one pixel section, for example, is shown in FIG. 2, the first electrode 12 comprising Al, Cu, Mg, Ag and the like is provided so that the micro-display 1 is connected to an output electrode of the control circuit (LSI) 11*a* formed on the substrate (wafer) 11 comprising, for example, silicon and the like via a contact hole of the insulator 11*b* of $SiO_2$ and the like. The organic layer portion 17 having at least the EL emitting layer 14 is provided on that first electrode 12. And then, it is formed by providing, for example, the second electrode 19 which has a light transmitting characteristic and comprises indium oxide and the like on that organic layer 17. The organic layer portion 17 comprises the positive hole transporting layer 13 consisted of, for example, NPD, the EL emitting light layer 14 consisted of Alq doped with quinacridon or cumarin of 1 wt %, the electron transporting layer 15 consisted of Alq and the electron injection layer 16 consisted of LiF. An emitting color can be changed by changing materials of this organic layer portion 17 and each pixel is formed in a matrix shape so as to be patterned to be a required number of pixels from a simple display having less than on the order of 100×100 pixels to a fine display having more than on the order of 1000×1000 pixels by forming one pixel with three primary colors of R, G and B or monochrome.

The reflected light detecting means 4 is formed which comprises the block where the light emitting section 41 and the light receiving section 42 are formed alternately as shown in FIGS. 1(*b*) to 1(*e*) in a portion of the end section or the central section of this micro-display 1. FIG. 1(*b*) shows an example in which the light emitting section 41 and the light receiving section 42 are formed alternately, FIGS. 1(*c*) and 1 (*d*) shows an example in which the light emitting section 41 is formed within the light receiving section 42 and FIG. (e) shows an example in which the light receiving section 42 is formed in the center section of the light emitting section 41. The light emitting section 41 can be formed by an organic EL element similar to each pixel mentioned above and the light receiving section 42 is formed by providing pn junction on the silicon substrate 11. The dimensions BW of the block comprising this light emitting section 41 and the light receiving section 42 are formed in a dimension within a diameter of the beam waist section, the most narrow portion W, into which the reflected light reflected by retina originally emitted from the light emitting section 41 converges as shown in FIG. 1 (*f*), and it is constructed such that the reflected light of emitted light from the light emitting section 41 can be received as it is without employing beam splitter and the like. These light emitting sections 41*s* are provided in three places and by forming light emitting sections of three primary colors of R, G and B respectively, the intensity of respective R, G and B of the reflected lights can be detected.

As for the micro-display 1, if it is not formed by the foregoing organic EL element, each pixel can be formed by liquid crystal layer which is made by miniaturizing a conventional liquid crystal display. In this case, it is preferable since a logic circuit can be easily made by forming it on the silicon substrate, liquid crystal display of reflection type is preferably adopted. As the illustration similar to that of FIG. 1 as other embodiment is shown in FIG. 3, LED of three primary colors of R, G and B has been previously provided within the case 3, the LED is driven in synchronization with each pixel of liquid crystal layer and color display can be carried out by the reflected light of its mixed colors.

Figure 3:
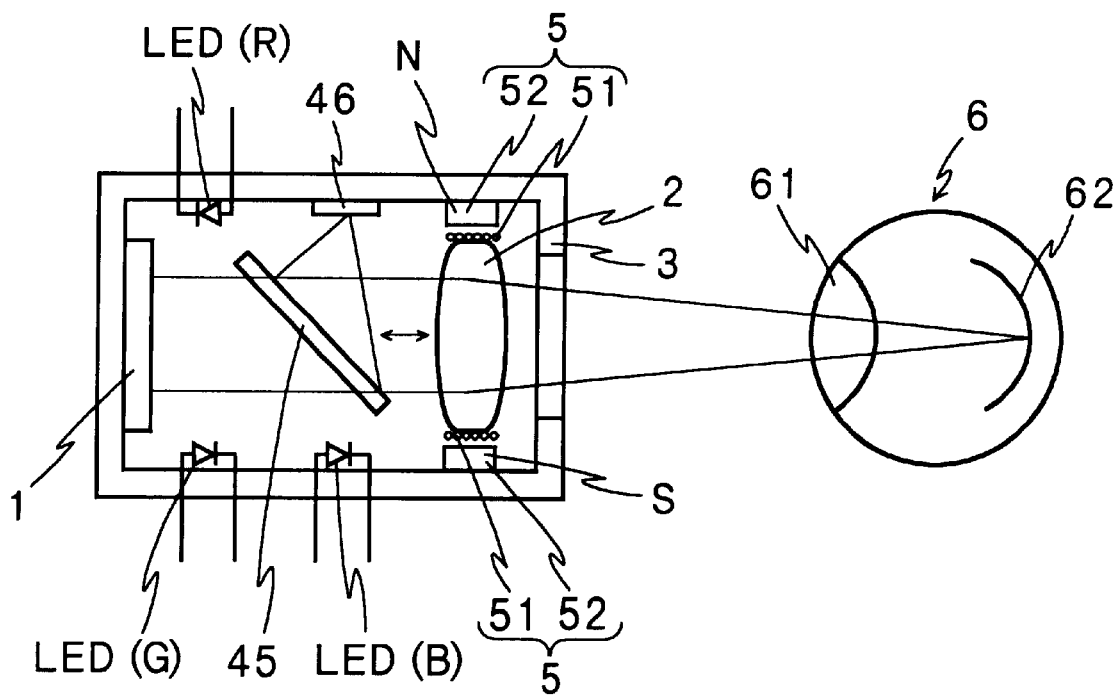
FIG. 3 is a constitutive illustration in other embodiment of a head mounted display (HMD) according to the present invention.

As shown in FIG. 3, if a liquid crystal is employed as the micro-display 1, the foregoing reflected light detecting light means 4 can be provided in the portion of liquid crystal layer being absent, however, the light emitting section must be formed separately from liquid crystal layer, the manufacturing process will be complex. In such cases, as shown in FIG. 3, it is also possible that the location relationship between the micro-display 1 and the condenser lens 2 can be adjusted so that the intensity of the reflected light becomes the maximum by inserting the half mirror 45 between the micro-display 1 and the condenser lens 2 and by detecting reflected light reflected by the half mirror 45 using the detector 46 just like a receiving light element. Of course, also in the case where this half mirror 45 is employed, a light emitting section exclusively used for detecting reflected light on the side of the micro-display 1 is formed, and noise reduction can be also contemplated by modulating the light emitting section.

The condenser lens 2 is consisted of a conventional convex lens which focuses an image of the micro-display having a dimension of on the order of a few square centimeter to a square of millimeter units on retina 62 as it is before the lens 61 of the human eye 6 adjusts and is formed with plastics and the like.

The reflected light detecting means 4 is constituted so that the reflected light is detected by the block of the light emitting section 41 and the light receiving section 42 provided in a portion of the micro-display 1 for example as the above mentioned. If the coupling onto the retina 62 by the condenser lens 62 is optimized, the reflected light reflected by the retina 62 is also the largest, and if the focus and the like are out, the reflected light is smaller. Therefore, it is determined whether or not focusing an image is optimized onto the retina 62 by monitoring the intensity of the reflected light detected by the reflected light detecting means 4. For example, it is determined where the condenser lens should be moved by detecting amounts of light of the reflected light while moving the condenser lens 2 forward or backward and the optimum location can be detected. In this case, as described above, if the reflected light is detected using more than two kinds of different wavelengths, the chromatic aberration of the optical system can be utilized, it is immediately distinguished from the relationship of respective amounts of lights to which direction shift should be performed. Moreover, if the reflected light detecting means 4 are provided in at least two places on different portions of the micro-display 1, it is immediately distinguished to which direction the shift should be performed by previously automatically controlling the monitoring intensity rate of the reflected light of two points at different points to be maintained constantly and accordingly it is distinguished from the relative relationship.

The above mentioned light emitting section 41 and the light receiving section 42 are very small and their amounts of emitting lights are also slight. Therefore, the detection performed by the light receiving section 42 (the detector 46) is also easily influenced by noises. In such cases, the optimum location relationship can be accurately obtained without subjecting to any influence of noises by modulating the driving input of the light emitting section with alternating current (frequency modulating means) and by receiving light signal by the light receiving section via band pass filter of the modulation frequency.

Means for moving the condenser lens 2 can be constituted in similarity to, for example, a focusing servo of optical pickup, as shown in FIG. 1, it is constituted so that the condenser lens 2 can be moved by the location adjusting means 5 consisted of the driving coil 51 and the magnet 52 and can be moved forward and backward depending upon the intensity of the reflected light detected by the reflected light detecting means 4. In FIG. 1, although the location adjusting means for adjusting its focus onto the retina 62 by moving the condenser lens 2 forward and backward, this location adjusting means can be also made it to move the side of the device along with the movement of pupil by inplane movement along with the movement of eyes (means for moving in inplane), or by tilting lens (means for tilting relative to the axis direction) as well as focus.

Moreover, although an example of movement of the condenser lens 2 is represented in the above mentioned description, in the case of adjusting the focus, since the point is the relative relationship between the micro-display 1 and the condenser lens 2, it is not needed that the condenser lens 2 is necessarily moved, and it will be good enough to move the micro-display 1. Specifically, it will be good enough to adjust the location relationship between the micro-display 1 and the condenser lens. Accordingly, it will be good that both of the micro-display 1 and the condenser lens 2 is moved. Moreover, it is also good that the micro-display 1 is tilted.

Moreover, in the case where detection output detected by the reflected light detecting means 4 is extremely small, since it is meant that pupil of eyes is not directed to the display, but to the outside world, adjustment cannot be performed by the location adjusting means. On the other hand, in the case where such conditions continues more than certain time period, as one does not utilize the display, the operation of the display, or display and the entire computer main sections can be made switched off as power saving mode such as the conventional personal computers. Specifically, in the case where output of the reflected light detecting means 4 is lower than certain value in certain time period, a circuit for switching on to power saving mode can be inserted and thereby can suppress consumption of power of portable devices and it is especially preferable to use as a portable device.

According to the present invention, a head mounted display with which one is capable of observing personally provided a micro-display of microminiaturization in front of eyes is mounted in front of eyes, and in the case where one sees the display in a state of seeing the outside world, since focusing an image of the display is adjusted corresponding to the state of lens of eye compatible to the outside world, one can see an image of the display without feeling of wrongness. As a result, in the case one of eyes sees the outside world, other eye sees the display, or in the case one sees the display which is made in a state of see-through, or in the case where one sees the display and the outside world alternately, the fatigue of eyes and the feeling of wrongness are disappeared and one can enjoy seeing the display extremely comfortably.

According to the present invention, since one can enjoy seeing the head mounted display mounted in front of eyes without any feeing of wrongness, wearable trends of personal computer is possibly promoted and it can contribute to the popularization of wearable computers.

It will also be appreciated that, although a limited number of embodiments of the invention have been described in detail for purposes of illustration, various modifications may be made without departing from the spirit and scope of the invention. Accordingly, the invention should not be limited except as by the appended claims.

What is claimed is:

1. A head mounted display comprising:

a micro-display, a condenser lens focusing an image of said micro-display onto retina of a human eye, a reflected light detecting means for detecting brightness of a reflected light reflected on said retina, and a location relation adjusting means for adjusting the relationship between said micro-display and said condenser lens so as to optimize a focusing image on said retina by brightness of said reflected light.

2. The head mounted display of claim 1, wherein said reflected light detecting means comprises a block of a light emitting section and a light receiving section formed in a portion of a display section of said micro-display and said means detecting a reflected light reflected on said retina, which is originally a light emitted from said light emitting section, by said light receiving section.

3. The head mounted display of claim 1, wherein a half mirror is provided between said micro-display and said condenser lens, and a detector for detecting said reflected light reflected by said half mirror is provided, whereby said reflected light detecting means is constituted.

4. The head mounted display of claim 1, further comprising: a frequency modulating means which modulates a light of said light emitting section by alternating current, and a band pass filter selecting a detecting signal of the reflected light of said light which is modulated by said frequency modulating means.

5. The head mounted display of claim 1, wherein said reflected light detecting means has detecting sections of at least two colors of different wavelengths and adjusts said relationship to an optimal location based on correlation with said detecting sections of at least two colors.

6. The head mounted display of claim 1, wherein said reflected light detecting means has detecting sections of said reflected light in at least two places of different locations on said micro-display and adjusts said relationship to an optimal location with correlation of said detecting sections of at least two places.

7. The head mounted display of claim 1, wherein said micro-display is constituted by that displaying pixels are formed on semiconductor substrate in which an integrated circuit is formed.

8. The head mounted display of claim 1, wherein an automated switch means is further provided in which at least said micro-display or a computer main body is made into power saving mode by detecting the output of said reflected light detecting means.

9. The head mounted display of claim 1, said location adjusting means is formed so as to move said condenser lens or micro-display by a driving coil and a magnet.

10. The head mounted display of claim 1, wherein said location adjusting means has means for moving in inplane of said condenser lens or means for tilting to axis direction of said condenser lens.

11. The head mounted display of claim 7, wherein said micro-display comprises an organic EL element.

12. The head mounted display of claim 7, wherein said micro-display comprises a liquid crystal display.

* * * * *